United States Patent [19]

Inagaki

[11] Patent Number: 4,549,799
[45] Date of Patent: Oct. 29, 1985

[54] FOCUS ADJUSTING MECHANISM FOR A CAMERA

[75] Inventor: Tetsuhiko Inagaki, Sakai, Japan

[73] Assignee: Minolta Camera Kabushiki Kaisha, Osaka, Japan

[21] Appl. No.: 596,746

[22] Filed: Apr. 4, 1984

[30] Foreign Application Priority Data

Apr. 6, 1983 [JP] Japan .................................. 58-61374

[51] Int. Cl.$^4$ ............................................... G03B 3/00
[52] U.S. Cl. .................................................. 354/400
[58] Field of Search .......................... 354/400–403, 354/195.1, 195.12, 457; 352/140

[56] References Cited

U.S. PATENT DOCUMENTS

| 4,104,657 | 8/1978 | Frank et al. | 354/451 |
| 4,119,979 | 10/1978 | Frank et al. | 354/234.1 X |
| 4,162,832 | 7/1979 | Frank et al. | 354/234.1 X |
| 4,190,336 | 2/1980 | Frank et al. | 354/226 X |
| 4,198,140 | 4/1980 | Frank et al. | 354/457 |
| 4,238,153 | 12/1980 | Imura | 354/400 |
| 4,291,958 | 9/1981 | Frank et al. | 352/140 X |
| 4,303,324 | 12/1981 | Marcus | 354/402 |
| 4,361,387 | 11/1982 | Cloutier | 354/266 X |

FOREIGN PATENT DOCUMENTS 161930 12/1979 Japan .......................... 354/195.12

Primary Examiner—William B. Perkey
Attorney, Agent, or Firm—Wolder, Gross & Yavner

[57] ABSTRACT

A focus adjusting mechanism for a camera includes a fixed lens and an auxiliary lens carried by a supporting member. The supporting member is movable between an advanced position for holding the auxiliary lens in the optical path of said fixed lens and a retracted position for holding the auxiliary lens out of the optical path of the fixed lens. The supporting member is biased from its retracted to advanced position but the movement thereof toward the advanced position is normally restrained by a piezoelectric bender element provided within the locus of said supporting member. The piezoelectric bender element is transformed and moved out of the locus of the supporting member for releasing the restraint when a proper voltage is applied to the electric bender element. A power supply circuit is provided for generating the proper voltage to be applied to the piezoelectric bender element. A control circuit is also provided for applying the proper voltage to the piezoelectric bender element when the object to be photographed is at the predetermined distance from the camera.

7 Claims, 13 Drawing Figures

FOCUS ADJUSTING MECHANISM FOR A CAMERA

BACKGROUND OF THE INVENTION

1. Field of the Invention

The present invention relates to a simplified focus adjusting mechanism for a camera.

2. Description of the Prior Art

In a mechanism for adjusting the focus of the objective lens of a camera, a construction is usually employed wherein a part of the objective lens or the whole of the lens system is continuously moved to adjust the focusing. However, such a mechanism is complicated in structure and expensive in cost. Hence, a simplified mechanism is known which includes a plurality of auxiliary lenses provided within a camera body such that one of the auxiliary lenses is selected and brought into axial registry with the objective lens in accordance with the camera-to-object distance thereby yielding a proper focus. Japanese patent laid-open publication No. 54-161930 shows an example of such a simplified focus adjusting mechanism which is employed in an automatic focusing camera. This mechanism, however, requires a plunger and/or an electromagnet for bringing one of the plurality of auxiliary lenses into the photographing optical path and stopping it thereat. The plunger and electromagnet are relatively large in size so that it is difficult to make the camera compact and thin. Accordingly, such focus adjusting mechanism is unsuitable for use, especially in a thin vertically disposed camera since the mechanism is disadvantageous in making the camera large in size and restricts the flexibility of arranging other parts upon designing of the camera.

SUMMARY OF THE INVENTION

An object of the present invention is to provide a focus adjusting mechanism which is extremely simple in construction.

Another object of the present invention is to provide a light and small-size focus adjusting mechanism which is suitable to be incorporated in a compact camera.

DETAILED DESCRIPTION OF THE PREFERRED EMBODIMENT

Figure 1:
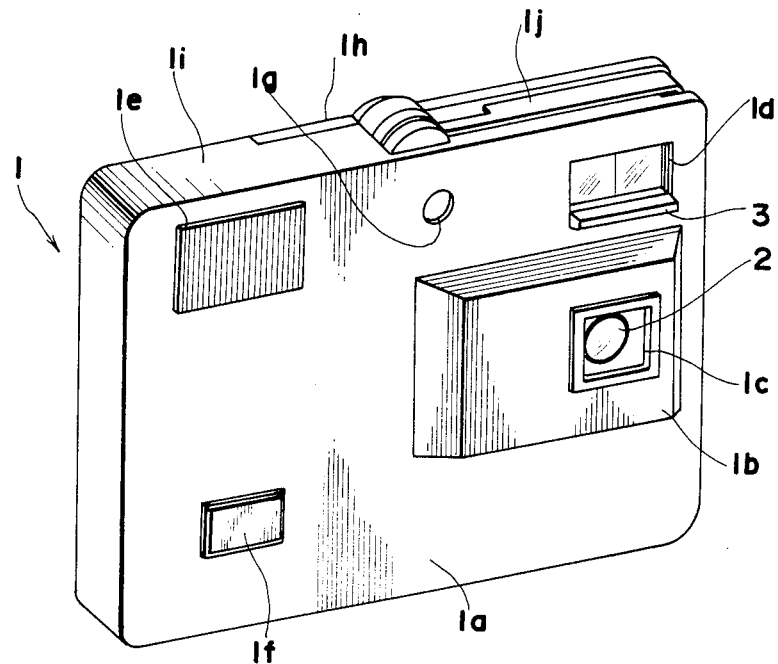
FIG. 1 is a perspective view of a camera to which the present invention is applied.

Embodiments of the present invention will now be described with reference to the attached drawings. FIG. 1 shows a camera in which a simplified focus adjusting mechanism of the present invention is employed. The camera associated with the embodiment is a thin vertically disposed camera for use with a disk film cartridge.

The camera 1 has a thin and substantially rectangular parallelepiped shape. The front flat wall 1a is formed with a protrusion (or protuberance) 1b which protrudes forwardly in the vertically middle and rightward portion of the wall as viewed from the front of the camera. In the rightward portion of the protrusion 1b is provided a picture taking objective window 1c behind which is located a camera objective lens 2. In the upper right corner of the front wall 1a as viewed from the front of camera 1, a viewfinder window 1d is located. The frame of the viewfinder window 1d slidably supports a cover plate (not shown) which serves to open and close the viewfinder window 1d and the objective lens window 1c. A projection 3 integrally provided with the cover plate projects forwardly through the viewfinder window so as to be manually operated. When the projection 3 is slid upwards, the viewfinder window 1d and the objective lens window 1c are covered or closed by the cover plate. On the other hand, a window 1g for a photocell for light measurement is located at an upper and transversely central portion of the front wall. In the upper left corner is located a light emitting portion 1e of an electronic flash device incorporated in the camera, while in the lower left corner is located a shutter release button 1f.

Lid member 1h is hinged at its lower-most edge to the rear of the camera to open and close a film cartridge chamber. On the top face 1i of the camera 1, a lock lever 1j is pivotably supported by a pin or rod which extends in parallel with the optical axis of the objective lens 2. When the lock lever 1j is raised from the position shown in FIG. 1, a lock mechanism that has been restraining the lid member 1h in its closed position, releases the restraint of lid member 1h, enabling loading and unloading of a film cartridge.

Figure 2:
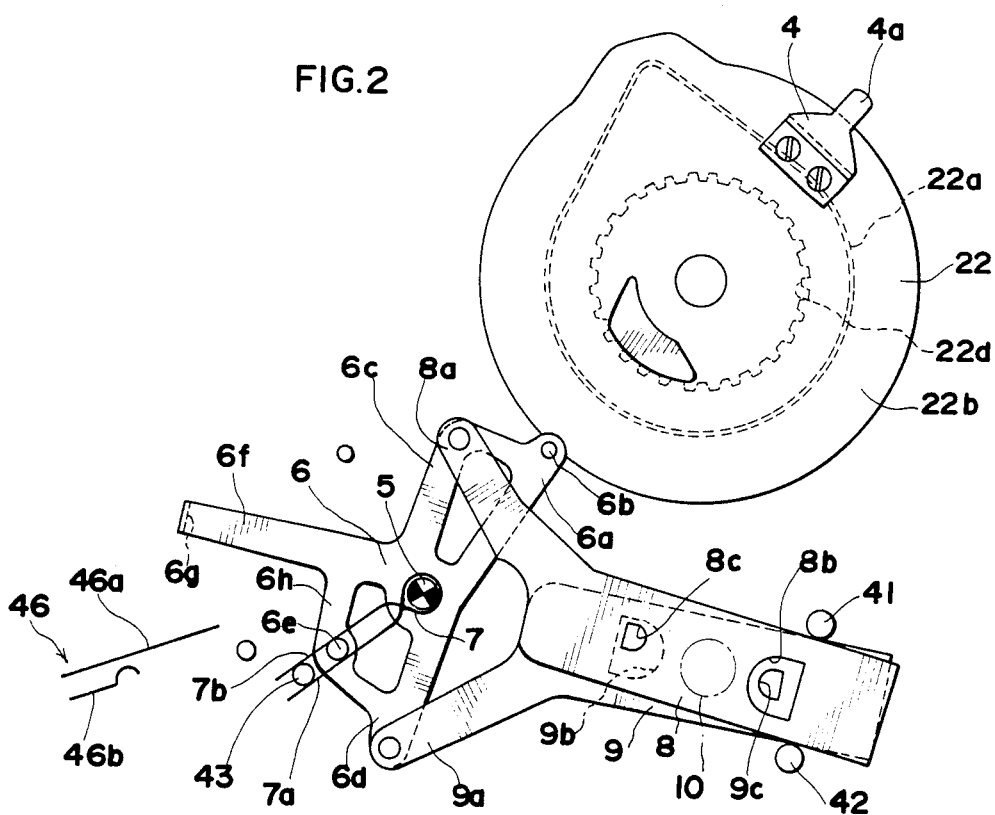
FIG. 2 is a front elevational view of a shutter mechanism incorporated in the camera.

FIG. 2 shows a shutter device which is mounted on a base plate (not shown) that is arranged in parallel with the front wall of the camera and is incorporated in the camera 1. Accordingly, the shutter device is designed to have a generally flat shape.

A rotary disk 22 is rotatably supported on the base plate by pin or stud which extends in parallel with the optical axis of the objective lens. On the front (in the sense of front side of the camera) surface 22b of the rotary disk 22 is fixed a shutter operating member 4 by screws such that the free stepped end of the member 4 projects from the outer periphery of the rotary disk 22. In the vicinity of the rotary disk 22 is located an interlocking member 6 which is rotatably supported by a pin 5 on the base plate. The interlocking member 6 has first and second arms 6c and 6d extending in the opposite directions from the pin 5 and a third arm 6f extending substantially perpendicularly to the first and second arms 6c and 6d. The first arm 6c extends towards the rotary disk 22 such that a driven pin 6b carried on the projection 6a of the first arm 6c lies in the rotary moving path of the stepped end 4a of the shutter operating member 4 on the rotary disk 22. Thus, the stepped end 4a will come into abutment with the driven pin 6b when the disk 22 rotates. The second and third arms 6d and 6f are bridged by a bridge portion 6h which carries a pin 6e thereon. Another pin 43 is fixed on the base plate.

A spring 7 is wound around the pin 5 with the straight portions or arms 7a and 7b of the spring resiliently embracing both pins 6e and 43 so that the interlocking member 6 is normally maintained at the neutral position shown in FIG. 2. The ends of the first and second arms 6c and 6d of the interlocking member 6 are connected with arms 8a and 9a of first and second shutter blades 8 and 9 such that the arms 8a and 9a can rotate relative to the arms 6c and 6d. The first and second shutter blades 8 and 9 are arranged to overlap each other and normally lie across the optical axis of the camera objective lens 2 to cover an exposure aperture 10 which is positioned between the objective lens 2 and the film plane of the camera. Each of the shutter blades 8 and 9 is formed with a large opening and a small opening. The large opening 8b and the small opening 8c of the first shutter blade 8 are formed at positions substantially symmetric with respect to the optical axis of the objective lens 2, and the large opening 9b and the small opening 9c of the second shutter blade 9 are also formed at positions substantially symmetric with respect to the optical axis of the objective lens 2. The large openings 8b and 9b are symmetric with each other with respect to the optical axis. The small openings 8c and 9c are also symmetric with each other respect to the optical axis. Accordingly, the movement of the shutter blades 8 and 9 in the opposite directions by the same amount will cause the large openings 8b and 9b or small openings 8c and 9c to overlap on the optical axis. The shutter blades 8 and 9 are confined between a pair of pins 41 and 42 to move in a specific direction.

A synchronizing switch 46 for firing the electronic flash device has a movable contact 46a and a fixed contact 46b. When the brightness of the scene to be photographed (scene brightness) is low, the interlocking member 6 turns in the counterclockwise direction so that the lower bent projection 6g at the free end of the third arm 6f comes into abutment with the movable contact 46a to curve the latter and bring it into contact with the fixed contact 46b. If the power source switch of the electronic flash device has been closed, the flash device is triggered to emit flash light in response to the closing of synchronizing switch 46.

On the rear side of the rotary disk 22 is integrally formed an inner gear 22d with its rotary axis being common with that of the rotary disk. The inner gear 22d is engaged by a planet gear (not shown) of a planet gear mechanism which gear in turn is engaged by a sun gear (not shown) which is linked with a film transport mechanism.

Figure 6:
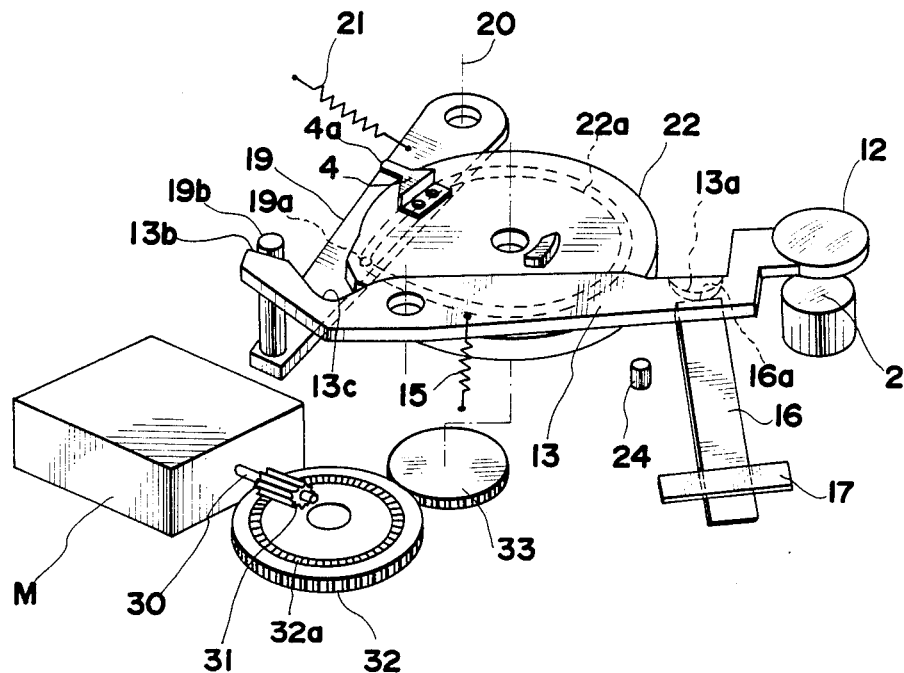
FIG. 6 is a perspective view of the above embodiment.

FIG. 6 shows a mechanism for driving the above described rotary disk 22 and a simplified focus adjusting device driven by the rotary disk. Motor M has a shaft 30 on which a gear 31 is fixed. The gear 31 is connected through a crown gear 32a and a gear 32 to a gear 33. The gear 33 is connected to a carrier gear (not shown) which is part of the aforementioned planet gear mechanism. The above mentioned planet gear (not shown) is pivoted on the upper surface of the carrier gear. Thus, the rotation of the motor M is transmitted through the above described gear train to the planet gear mechanism to rotate the planet gear. As the planet gear is in engagement with both the sun gear and the inner gear 22d, the sun gear begins to rotate to effect film transportation as soon as the load to the film transporting mechanism is lightened upon termination of exposure. When the film transportation is completed, a metering pawl tooth as is disclosed in U.S. Pat. No. 4,361,387 drops into one of metering notches formed along the edge of the film disk, each of the notches corresponding to each picture frame of the film. Thus, the film transportation is interrupted to increase the load to the sun gear so that the rotation of the motor will not drive sun gear but instead the inner gear 22d.

Figure 3A:
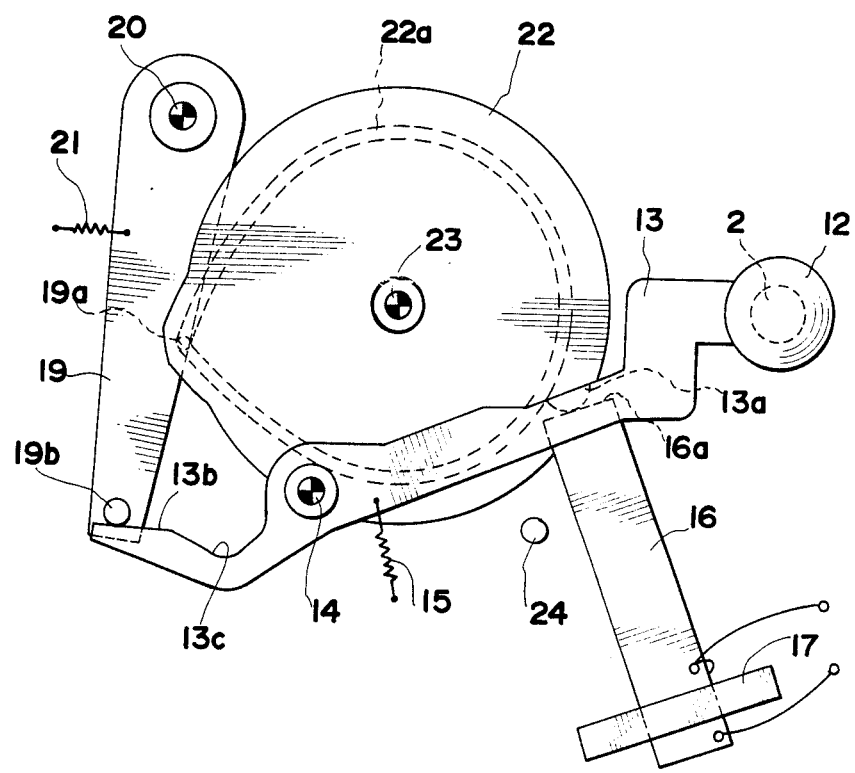
FIG. 3A is a front elevational view of the first embodiment of the present invention at the state before it is released.

On the rear side of the rotary disk 22 is integrally formed a cam groove 22a as shown in FIGS. 2, 3A and 6. The cam groove 22a is substantially circular and coaxial with the rotary disk 22 with a portion thereof swelling outwardly. The cam groove 22a receives a pin 19a carried by a control lever 19 which is arranged in the vicinity of the rotary disk. The control lever 19 is pivotably supported by a pin 20 on the base plate and is urged by a spring 21 in the clockwise direction i.e. in the direction away from the rotary disk. The control lever 19 carries a control pin 19b on the free end thereof.

In the vicinity of the rotary disk 22, a lens supporting member 13 is pivotably mounted and supports, on one end thereof, an auxiliary lens 12 for close-up photography. The lens supporting member 13 is urged by spring 15 in the clockwise direction and is formed, at its other end, with a tail cam 13b which is in abutment with the control pin 19b on the control lever 19 so that the supporting member 13 is maintained at the position shown in FIG. 6 wherein the auxiliary lens 12 is in axial alignment with the camera objective lens 2. On the rear side (in the sense of the rear side of the camera), i.e. on the underside (as viewed in FIG. 6) of the lens supporting member 13 is formed an engaging piece 13a integrally with the member 13 to be engaged by the end of piezoelectric bender element 16.

The piezoelectric bender element 16 is a tongue shaped member composed of a metal strip sandwiched between a pair of strips of piezoelectric material such as lead zircontate titanate (PZT) and has the property of curving when a voltage is applied between the piezoelectric elements or between the metal strip and a piezoelectric element on its surface. The curved piezoelectric bender element restores to its original form when the applied voltage is removed. The piezoelectric bender element is fully described in U.S. Pat. No. 4,291,958.

Figure 7:
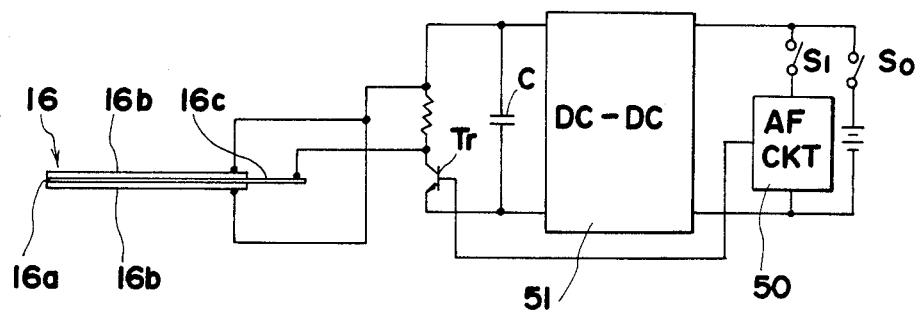
FIG. 7 is a circuit diagram of the network employed in the above embodiment.

The present embodiment employs a parallel type piezoelectric bender element wherein voltage is applied between its intermediate metal strip and a piezoelectric element on its surface. The piezoelectric bender element 16 is fixed at its one end to the base plate (not shown) by a restraining plate 17 with the other end being free and located to engage the engaging piece 13a. The piezoelectric bender element 16 is arranged as shown in FIG. 7 such that one of the electric terminals is connected with piezoelectric elements 16b and 16b on both sides and the other terminal is connected with the intermediate metal plate 16c whereby the piezoelectric bender element deforms in response to a signal fed from an automatic focusing circuit 50 while switches $S_o$ and $S_1$ are closed. In FIG. 7, a capacitor C is charged by a DC-DC converter 51.

The operation of the embodiment will now be explained. Before photographing, rotary disk 22, the auxiliary lens control mechanism and the piezoelectric bender element 16 assume the states shown in FIG. 3.

When lid member 1h of the camera 1 shown in FIG. 1 is closed and the lock lever 1j is folded down to the top face of the camera, the lid member 1h is held at its closed position. Then, if operating or handling projection 3 is moved down, the objective lens window 1c and viewfinder window 1d are opened. In response to one of those operations, the switch $S_o$ in the circuit of FIG. 7 is closed to energize the DC-DC converter 51 which produces a high DC voltage and charges the capacitor with the voltage. Then, if the release button 1f of the camera 1 is depressed by the user, the switch $S_1$ is closed to energize the automatic focusing circuit 50 which generates a logic high voltage signal relying on the predetermined camera-to-object distance, e.g. when the object to be photographed is within the range from 1.2 meters to infinity (∞). The high voltage signal is applied to the base of a transistor Tr to render the latter conductive so that the charge on the capacitor C is discharged through the collector-emitter of the transistor. Then the parallel type piezoelectric bender element 16 receives the voltage with the piezoelectric elements 16b on both sides receiving positive potential and the intermediate metal 16c strip receiving negative potential.

Figure 5A:
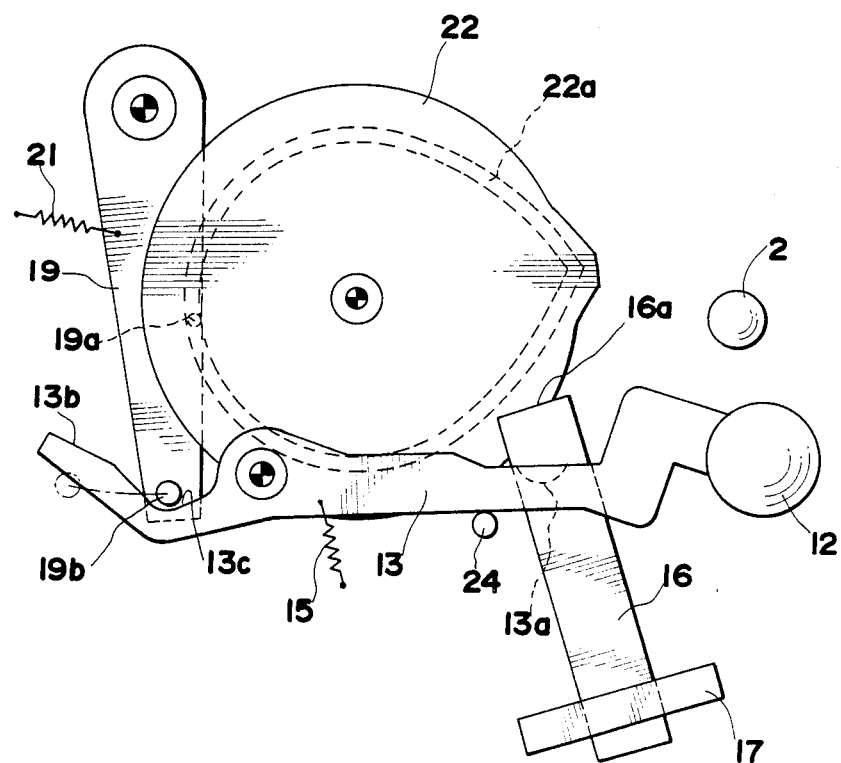
FIG. 5A is a front elevational view of the same embodiment but in the condition for taking a picture of an object at a long distance.
Figure 5B:
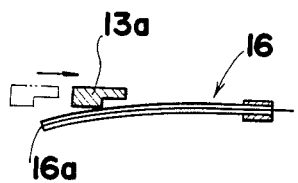
FIG. 5B is a side elevational view of the piezoelectric bender element of the embodiment shown in FIG. 5A.

With the application of the voltage, the piezoelectric bender element 16 curves as shown in FIGS. 5B. In case the object to be photographed is at a distance shorter than 1.2 meters, the high voltage signal is not generated by the automatic focusing circuit 50 so that the transistor Tr remains unconductive and no voltage is applied to the piezoelectric bender element 16.

Subsequent to the closure of the switch $S_1$ which caused the automatic focusing circuit 50 to generate or not to generate a high voltage in dependence on the camera-to-object distance, the motor M connected to the motor driving circuit (not shown) starts to rotate in response to the shutter release operation, i.e. the depression of the shutter release button. The motor driving circuit controls the motor M to rotate in a normal or reverse direction in response to the output signal from a light measuring circuit. For example, the motor driving circuit rotates the motor M in the normal direction with the brightness of an object to be photographed (object brightness) being low and in the reverse direction with the object brightness being high. The rotation of the motor M is transmitted through gears 31, 32 and 33 to the planet gear mechanism (not shown). If the film transportation has been completed, further film advancement will not be effected as described before and a large load is applied to the sun gear so that the rotation of the motor M is transmitted to the inner gear 22d of the rotary disk 22 and rotates the latter.

Figure 4:
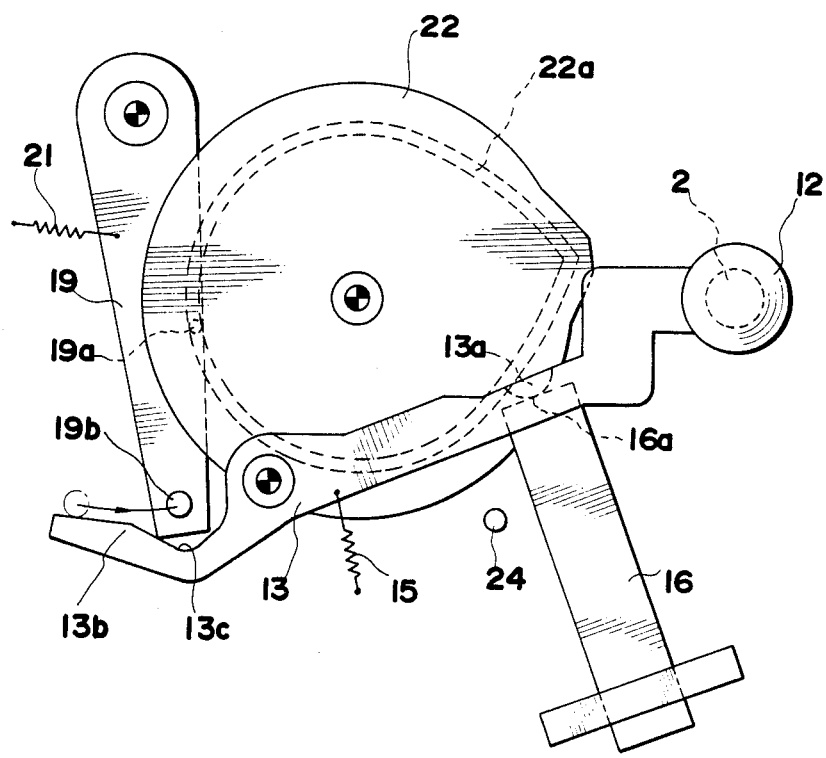
FIG. 4A is a front elevational view of the same embodiment but in the condition for taking a picture of an object at a short distance.
FIG. 4B is a side elevational view of the piezoelectric bender element of the embodiment shown in FIG. 4A.

When the motor M rotates in the normal direction, the rotary disk 22 rotates clockwise from the position shown in FIGS. 2, 3A and 6. With the rotation of the rotary disk 22, the pin 19a engaging the swelled portion of the cam groove 22a is shifted towards the rotational axis of rotary disk 22 from its outermost position so that the control lever 19 turns counterclockwise against the force of the spring 21. The control pin 19b carried by the control lever 19 moves along the tail cam 13b of the lens supporting member 13 and reaches the position facing the bottom of recess 13c as shown in FIGS. 4A and 5A as the pin 19a comes closest to the center of rotary disk. When the camera-to-object distance is more than 1.2 meters, the free end 16a of the piezoelectric bender element 16 is curved and displaced to the position shown in FIG. 5B. Therefore, the lens supporting member 13 rotates clockwise under the force of spring 15 as shown in FIG. 5A to retract the auxiliary lens 12 from axial alignment with the objective lens 2 thereby enabling photography of an object at a normal distance or long distance. The lens supporting member 13 is stopped by pin 24.

Figure 3B:
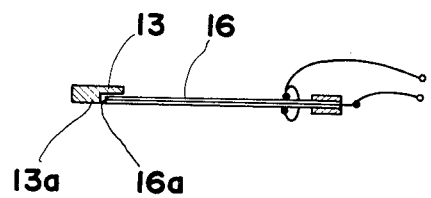
FIG. 3B is a side elevational view of the piezoelectric bender element in the embodiment of FIG. 3A.
Figure 4B:
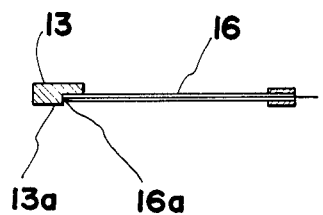

On the other hand, when the camera-to-object distance is short, e.g., less than 1.2 meters, the free end 16a of the piezoelectric bender element 16 remains at the position where it is in the locus or path of movement of the engaging piece 13a as seen in FIG. 3B. Thus, when the lens supporting member 13 turns slightly in the clockwise direction, the engaging piece 13a comes into abutment with the free end 16a of the piezoelectric bender element 16 as seen in FIG. 4B and the lens supporting member 13 is restrained from further rotating. Hence, the auxiliary lens 12 remains on the optical axis of the objective lens enabling short distance or close-up photography.

When the rotary disk rotates further, the bent portion 4a of the shutter operating member 4 drives the driven pin 6b on the interlocking member 6 from the right to the left as viewed in FIG. 2 to turn the interlocking member counterclockwise about pin 5. With the turning, the interlocking member 6 pulls the first shutter blade 8 which is pivotably connected to the first arm 6c, and pushes the second shutter blade 9 which is pivotably connected to the second arm 6d so that the large opening 8b and 9b of the shutter blades 8 and 9 overlap each other over the exposure aperture 10, effecting exposure with full open diaphragm aperture.

When the rotary disk 22 rotates further to disengage the portion 4a of the shutter operating member 4 from the driven pin 6b, the interlocking member 6 returns to its neutral position under the force of spring 7. With this, the shutter blades 8 and 9 return to close and thus the exposure with slow shutter speed is finished. The rotary disk 22 continues rotating in the clockwise direction until it rotates by 360° and stops. Just before the stopping of the rotary disk 22, pin 19a is driven away from the center of rotation of the rotary disk due to the swelled portion of the cam groove 22a so that the control pin 19b which engaged the recess 13c of the lens supporting member 13 again rides on the tail cam 13b as shown in FIG. 3A. The lens supporting member 13 turns counterclockwise against the force of spring 15 by a large amount in the case of the long distance photography or by a small amount in the case of the short or close-up photography, and returns to its initial position. The rotary disk 22 rotates by one rotation, i.e., 360° and stops at its initial position whereby the operation is completed.

The high voltage signal which has been generated from the automatic focusing circuit 50 in case of a long distance photography is interrupted as soon as a predetermined time period has elapsed. Then transistor Tr in the circuit of FIG. 7 is clocked so that the voltage applied to the piezoelectric bender element is removed and the bender returns to its initial condition.

When the motor M rotates in the reverse direction in response to a high-brightness signal, the rotary disk 22 rotates counterclockwise from the position shown in FIGS. 2, 3, and 6. With the rotation, pin 19a is advanced towards the center of rotation of the disk, thereby causing the control lever 19 to turn counterclockwise. When the control pin 19b arrives at a position facing or opposite to the bottom of the recess 13c, the lens supporting member 13 turns by a large amount to retract the auxiliary lens 12 from the front of the objective lens 2 when an object to be photographed is at a long distance with the piezoelectric bender element 16 being curved as shown in FIG. 5B. When the object is at a shorter distance, the piezoelectric bender element 6 remains at the position shown in FIG. 3B so that the lens supporting member 13 turns only slightly to align the optical axis of the auxiliary lens 12 with the optical axis of the objective lens 2.

When the rotary disk 22 rotates further in the counterclockwise direction, the end 4a of the shutter operating member 4 drives the driven pin 6b on the interlocking member 6 from the left to the right in FIG. 2, i.e., in the opposite direction from that in the above described former case, thereby turning the interlocking member 6 clockwise about the pin 5. With this turning, the interlocking member 6 pushes the first shutter blade 8 which is pivotably connected with the first arm 6c, and pulls the second shutter blade 9 which is pivotably connected to the second arm 6d. Accordingly, the small openings 8c and 9c of the shutter blades 8 and 9 overlap each other over the exposure aperture 10 effecting an exposure with a small diaphragm aperture.

Further rotation of the rotary disk 22 disengages the bent end 4a of the shutter operating member 4 from the driven pin 6b allowing the interlocking member 6 to return to its initial position 6 under the action of the spring 7.

Consequently, the shutter blades 8 and 9 return to close and thus the exposure with high-speed shutter is finished. The rotary disk 22 continues rotating in the counterclockwise direction until it stops upon rotation by 360°. Just before the rotary disk 22 stops, the pin 19a is driven away from the rotational axis of the rotary disk 22 due to the swelled portion of the cam groove 22a. Therefore, the control lever 19 is turned clockwise so that the control pin 19b which has assumed a position opposite to the recess 13c of the lens supporting member 13 returns to ride on the tail cam 13b as seen in FIG. 3A. Then, the lens supporting member 13 turns counterclockwise against the force of spring 15 by a large amount in case of a long distance photography or by a small amount in case of a close-up photography, and returns to its initial position. The rotary disk 22 finally rotates by 360° and finishes rotating when it comes to its initial position whereby the operation is terminated.

Upon the termination of the operation, the restraint of the film transportation is released to lighten the load to the sun gear of the aforementioned planet gear mechanism and the motor M is actuated to rotate the sun gear which advances the film by one frame. As the mechanism of such film transportation is not the subject of the present invention, the explanation thereof is omitted.

Although the parallel type piezoelectric bender element was employed in the above embodiment, a series type one may also be employed in lieu thereof. A series type piezoelectric bender element is such that it is curved when the voltage is applied between its upper and lower layers made of lead zircontate titanate (PZT). When such series type bender element is employed, the capacitor C in FIG. 7 may be connected with one of the piezo elements (upper layer) while the other element (lower layer) may be connected to the transistor Tr.

Figure 8:
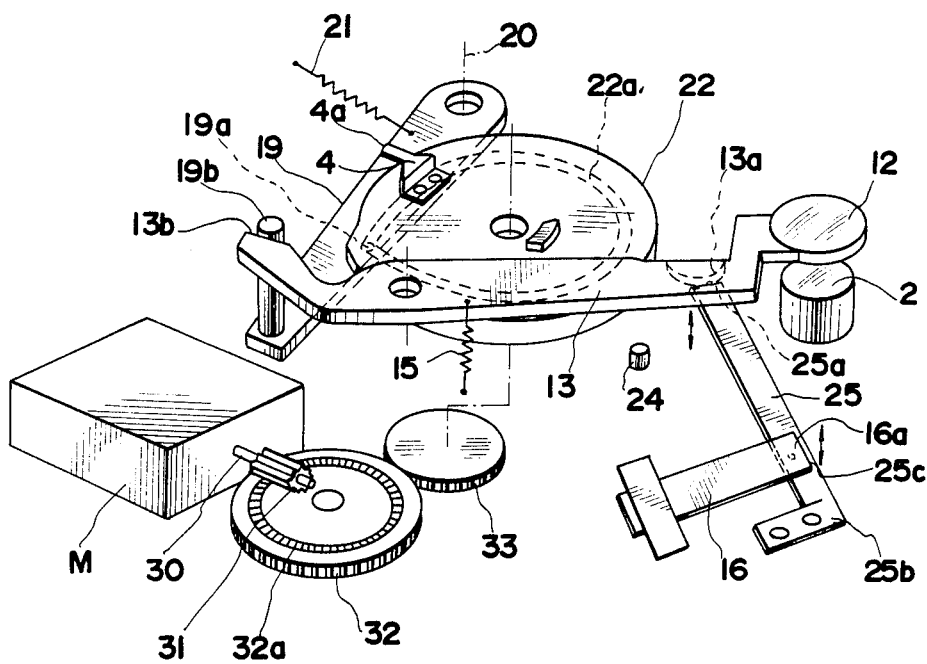
FIG. 8 is a perspective view showing the second embodiment of the present invention.

FIG. 8 shows another embodiment of the present invention which differs from the first embodiment, as shown in FIG. 6, in that the piezoelectric bender element does not directly engage the lens supporting member. In the embodiment shown in FIG. 8, an intermediate member 25 is provided or interposed between the piezoelectric bender element 16 and the lens supporting member 13. The intermediate member 25 is a thin resilient plate which is fixed at its one end 25b to the base plate (not shown). The free end 25a of the member 25 normally faces the engaging piece 13a of the lens supporting member 13 with a small gap therebetween as the free end 16a of the piezoelectric bender element in the first embodiment such that the free end 25a comes into contact with engaging piece 13a when the lens supporting member 13 turns slightly. In FIG. 8, the free end 16a of the piezoelectric bender element 16 is in engagement with the upper surface of the intermediate member 25 at the position 25C spaced a predetermined distance from the fixed end 25b.

When a voltage is applied to the piezoelectric bender element 16, its free end 16a moves downward by the curving of the bender element 16 as in the case of the first embodiment. The displacement of the free end 16a of the piezoelectric bender element 16 causes the portion 25c of the intermediate member 25 to be displaced downward by the same amount as that of the displacement of the free end 16a. Accordingly, the free end 25a is increasingly displaced since the amount of the displacement of the portion 25a is increased by the ratio of the distance of the portion 25c from the fixed end 25b to the distance of the free end 25a from the fixed end 25b. Therefore, with the structure of the second embodiment, the engagement and disengagement between the free end 25a and the engaging piece 13a is ensured.

Figure 9:
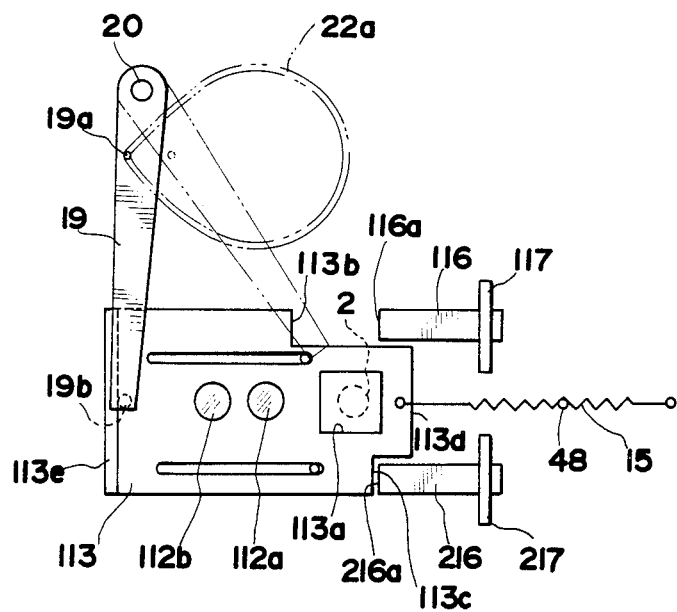
FIG. 9 is a fragmentary front view of a third embodiment.
Figure 10:
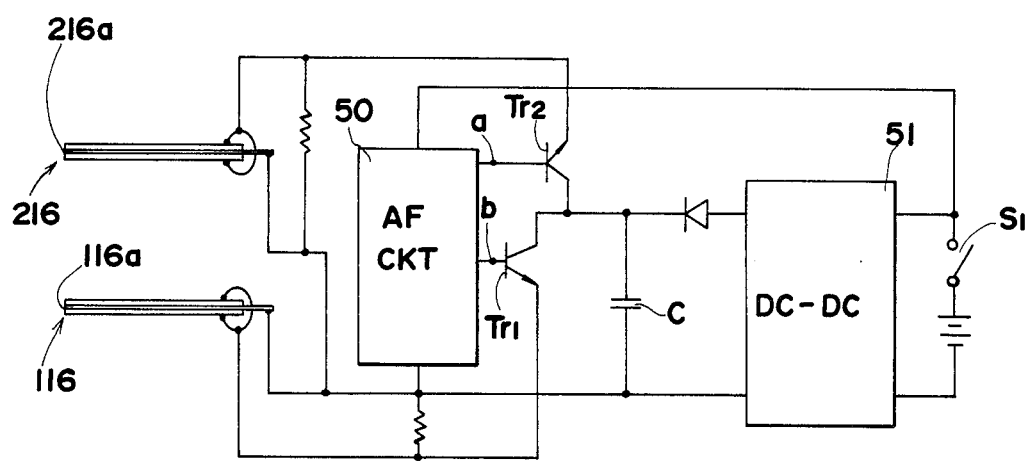
FIG. 10 is a circuit diagram of a circuit associated with the third embodiment.

FIGS. 9 and 10 show a third embodiment of the present invention which is arranged such that photography of a distant object is made with an objective lens only while middle distance and close-up photographies are made with first and second auxiliary lenses being selectively associated with the objective lens, thereby enabling zone focus adjustment.

The construction of the camera and the shutter mechanism in the third embodiment are the same as that of the first embodiment as shown in FIGS. 1 and 2. Accordingly, explanation thereof will be omitted here to avoid repetition.

As in the case of the first embodiment, the rotary disk which is rotated in normal and reverse directions by a motor, is formed at its rear side (in the sense of back side of the camera) with an annular cam groove 22a having a swelled portion. It should be noted that, in FIG. 9, the rotary disk is not shown but only the cam groove 22a is shown by a phantom line. The cam groove 22a receives the pin 19a carried by the control lever 19 which in turn is pivoted at one end by the pin 20 on the base plate. The control lever 19 carries on its free end a control pin 19b.

In the vicinity of the rotary disk (not shown) is disposed a lens supporting member 113 for supporting a pair of auxiliary lenses. The lens supporting member 113 is formed with two slots which extend laterally as viewed in the Figure and which receives two guide pins respectively fixed on the base plate (not shown) such that the lens supporting member 113 can move parallel to the base plate only in the direction from the left to right. The right end 113d of the lens supporting member 113 is connected with the spring 15 which urges the lens supporting member 13 rightwards. The left edge of the lens supporting member 113 is bent upward to form a bent portion 113e which is engaged by the control pin 19b of the control lever 19. At the initial stage prior to the shutter release operation, the control pin 19a on the control lever 19 is kept in a position most retracted from the rotational axis of the rotary disk by the swelled portion of the cam groove 22a. Thus, the control pin 19b has moved the lens supporting member 113 against the force of spring 15 by way of the bent portion 113e.

The lens supporting member 113 is formed with two shoulders or stepped portions 113b and 113c at its right edge. The second shoulder portion 113b is formed at the leftward position with respect to the first shoulder portion 113c. The both shoulder portions are stepped vertically.

The lens supporting member 113 has, in view from the right, an opening 113a for distance photography, an auxiliary lens 112a for middle distance photography and an auxiliary lens 112b for short distance or close-up photography. The opening 113a is in front of the objective lens 2 when the lens supporting member 113 is at its leftmost position.

On the base plate, piezoelectric bender elements 116 and 216 are mounted with their one ends being fixed by retaining plates 117 and 217 and the other ends 116a and 216a being free. The piezoelectric bender elements 116 and 216 have the same structure as that of the first embodiment and are applied with voltages by the circuit shown in FIG. 10. The piezoelectric bender elements 116 and 216 are of the parallel type but may be of the series type. When no voltage is applied to the piezoelectric bender elements 116 and 216, their free ends 116a and 216a assume positions in the loci of the movements of the second shoulder portion 116a and the first shoulder portion 113c. respectively. The free end 116a is spaced a greater distance from the second shoulder portion 113b than the free end 216a is spaced from the first shoulder portion 113c. A pin 48 is fixed on the base plate.

In the circuit of FIG. 10, the switch $S_1$ is closed in response to the depression of the shutter release button to charge the capacitor C as well as to energize the automatic focusing circuit 50. Upon completion of the charging of the capacitor C, the automatic focusing circuit 50 generates, from two output terminals a and b, signals commensurate with a camera-to-object distance (hereinafter referred to as an object distance).

When the object distance is large, the both output terminals a and b are at low levels to leave non-conductive transistors $Tr_2$ and $Tr_1$ which have their bases connected to the outputs a and b. Hence, no voltage is applied to the piezoelectric bender elements 116 and 216. Subsequently, a motor (not shown) rotates to turn the rotary disk through the planet gear mechanism. When the cam groove rotates with the rotation of the rotary disk, the control pin 19a of the control lever 19 is moved towards the center of rotation in accordance with the shape of the cam groove 22a, causing the control lever to turn the control lever 19 counterclockwise about the pin 20 to the position shown by a phantom line in FIG. 9. The turning of the lever retracts the control pin 19b rightwards so that the lens supporting member 113 that has been retained by the control pin 19b moves to the right, under the force of spring 15. At the present situation, as no electric voltage is applied to the piezoelectric bender element 216, the free end 216a assumes the position to come into contact with first shoulder portion 113c, so that the lens supporting member 113 stops after it has moved a slight distance. At this time, the long range photography aperture 113a comes into alignment with the objective lens 2 enabling photography with only the objective lens 2. Then an exposure is made. When the rotary disk rotates by 360°, the control lever 19 is restored to its initial position in accordance with the shape of the cam groove 22a, with the control pin 19b pushing the bent portion 113e so that the lens supporting member 113 is retracted against the force of spring 15.

When the object distance is middle, a high voltage signal is generated only from the output terminal a. Accordingly, only the transistor $Tr_2$ us rendered conductive so that the piezoelectric bender element 216 is applied with a voltage by means of the charge stored in the capacitor C. Hence, the free end 216a of the piezoelectric bender element 216 shifts downwards. Subsequently, when the control lever 19 turns and the control pin 19b retracts, the lens supporting member 113 moves to the right under the force of spring 15. As the piezoelectric bender element 216 has shifted its free end 216a outside of the moving path of the first shoulder portion 113c, the lens supporting member 113 moves until the piezoelectric bender element 116 comes into abutment with the second shoulder portion 113b. At this time, the auxiliary lens 112a for middle range photography is brought into alignment with the objective lens 2 with the optical axis thereof being coincident with that of the objective lens 2.

The high voltage generated from the output terminal a of the automatic focusing circuit 50 is interrupted to restore the piezoelectric bender element 216 to its initial state after a lapse of a predetermined time.

When the object distance is short, high voltage signals are generated from both terminals a and b of the automatic focusing circuit 50 to make both transistors $Tr_2$ and $Tr_1$ conductive so that activating voltages are applied to both piezoelectric bender elements 216 and 116 which thereby deform. After that, the control lever 19 rotates to retract the control pin 19b allowing the lens supporting member 113 to move to the right under the force of the spring 15. At this time, as both the piezoelectric bender elements 216 and 116 have been deformed out of the paths of the first and second shoulder portions 113c and 113b, the lens supporting member 113 moves until it comes into abutment with the fixed pin 48, whereupon the auxiliary lens 112b for close-up photography is brought into alignment with the objective lens 2 with its optical axis coinciding with that of lens 2.

In the third embodiment described above, the aperture 113a for distance photography and auxiliary lenses 112a and 112b for middle distance and close-up photography may be replaced by one another or by other auxiliary lenses for different range photography, with the outputs of the automatic focusing circuit 50 being set to be generated for the different object distances. The number of auxiliary lenses and piezoelectric bender elements may be increased with the number of zones or distances to be focused being increased.

In the above described embodiments, the objective lenses were designed for distance photography, and one or two auxiliary lenses are provided so as to be brought into or retraced from alignment with the objective lens for focus adjustment. However, the lens to be brought into or retracted from objective lens alignment may be any type in so far as the selection of the insertion and retraction and the stopping position controlled by the piezoelectric bender element.

The present invention is constructed such that, in a camera wherein zone focus adjustment is made with an auxiliary lens being selectively brought into the photographic optical path, a supporting member for supporting the auxiliary lens is advanced or retracted by a biasing force and stopped at a desired position by a piezoelectric bender element.

Accordingly, the present invention is different from the conventional type automatic focusing device employing an electromagent or plunger in that the mechanism of the present invention does not require large space about the lens supporting member because the piezoelectric bender element can be designed to be a thin plate or strip with a thickness of about several millimeters and requires little displacement, and can be disposed on the same base plate as the focus adjusting mechanism to be in the path of movement of the lens supporting member occupying little space. Consequently, the camera can be made compact in size, light in weight and thin, and a simplified automatic focus adjusting mechanisml can be provided which does not affect or obstruct the arrangement of other mechanisms in the camera and does not disturb their flexibility or versatility of design.

What is claimed is:

1. A focus adjusting mechanism for a camera, comprising:

a fixed objective lens;

an auxiliary lens to be in and out-of alignment with objective lens for varying the total focal length of an objective;

supporting means for supporting said auxiliary lens and being movable from a first position to a second position via a third position along a plane perpendicular to the optical axis of said fixed lens, said auxiliary lens being in axial alignment with said fixed lens with said supporting means being at said third position, said auxiliary lens being out of alignment with said fixed lens with said supporting means being at said second position, and said first position being close to said third position;

urging means for urging said supporting means to said second position;

means for restraining said supporting means at said first position;

means for releasing said restraint in response to a shutter release operation;

control means for controlling the movement of said supporting means, said control means including a piezoelectric bender element movable to a transformed position from an initial position when said piezoelectric bender element is transformed by a proper voltage being applied thereto, said control means being movable into the locus of movement of said supporting means for preventing the movement thereof against said urging means when said control means is moved to said transformed position;

a power supply circuit for generating the proper voltage to be applied to said piezoelectric bender element; and a switching circuit connected between said power supply circuit and said piezoelectric bender element for controlling the application of the proper voltage to said piezoelectric bender element.

2. A focus adjusting mechanism as set forth in claim 1, wherein said auxiliary lens includes a lens which has an optical property to make said focal length of the objective longer with said lens being in alignment with said fixed lens, said switching circuit includes an automatic focusing circuit for generating a predetermined signal when an object to be photographed is at farther distance than a predetermined distance from the camera and a switching element connected between said power supply circuit and said piezoelectric bender element, said switching element being controlled by said automatic focusing circuit to become conductive and allow the application of the proper voltage to said piezoelectric bender element from said power supply circuit when said automatic focusing circuit generates the predetermined signal.

3. A focus adjusting mechanism as set forth in claim 2, wherein said piezoelectric bender element directly engages said supporting means when said control means comes into the locus of said supporting means.

4. A focus adjusting mechanism as set forth in claim 2, wherein said control means further includes a resilient plate member, one end of which is secured to the stationary portion of the camera body so that the other end of said resilient plate member is movable into the locus of said supporting member for preventing the movement of said supporting member, and wherein said piezoelectric bender element flexes to said resilient plate member for bringing the other end thereof into the locus of said supporting means when said piezoelectric bender element is transformed.

5. A focus adjusting mechanism as set forth in claim 1, wherein said camera includes means for effecting the camera exposure, and said restraint releasing means is further used for actuating said camera exposure effecting means in response to the shutter release operation.

6. A focus adjusting mechanism as set forth in claim 4, wherein said means for releasing includes a rotary disk which starts to rotate in response to the shutter release operation, said rotary disk being formed with a cam portion which engages said restraining means prior to the shutter release operation, and a drive member provided on said rotary disk for actuating said camera exposure effecting means after the movement of said supporting means.

7. A focus adjusting mechanism as set forth in claim 1, wherein said supporting means includes a pivotal lever which supports said auxiliary lens at the free end thereof and a stop means to be engaged by said control means when said piezoelectric bender element is at said initial position, said stop means being integrally formed with said pivotal lever in the vicinity of said auxiliary lens and relatively far from a pivot of said pivotal lever.

* * * * *